United States Patent Office 3,658,878
Patented Apr. 25, 1972

3,658,878
ETHYLENICALLY UNSATURATED CYANO
GROUP CONTAINING COMPOUNDS
Donald Arthur Smith, Rochester, N.Y., assignor to Eastman Kodak Company, Rochester, N.Y.
No Drawing. Application Aug. 22, 1968, Ser. No. 754,731, now Patent No. 3,554,987, dated Jan. 12, 1971, which is a continuation-in-part of application Ser. No. 525,272, Dec. 20, 1965, now Patent No. 3,459,790. Divided and this application Jan. 22, 1970, Ser. No. 10,676
Int. Cl. C07c *121/30, 121/48, 121/66*
U.S. Cl. 260—465.4
2 Claims

ABSTRACT OF THE DISCLOSURE

A compound having the formula:

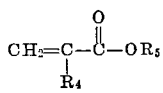

where $R_4$ is hydrogen, an alkyl group containing up to 12 carbon atoms or

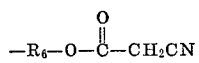

where $R_6$ is an alkylene group containing up to 10 carbon atoms; and $R_5$ is an alkyl group containing up to 10 carbon atoms, a cycloalkyl group containing up to 10 carbon atoms, a phenyl group or

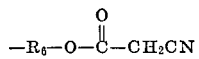

where $R_6$ is an alkylene group containing up to 10 carbon atoms, provided that one and only one of $R_4$ and $R_5$ is always

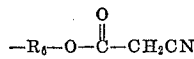

---

This application is a division of U.S. Ser. No. 754,731, filed Aug. 22, 1968, now U.S. 3,554,987, which in turn was a continuation-in-part of U.S. Ser. No. 525,272, filed December 20, 1965, now U.S. 3,459,790.

This invention relates to organic materials which are particularly useful in the photographic field. In one of its aspects, this invention relates to the preparation and use of such organic materials, particularly polymeric materials which can be incorporated into photographic elements and emulsions to obtain a desirable combination of properties. In another of its aspects, this invention relates to photographic materials, their preparation and use.

Photographic elements employed in photography, particularly in the graphic arts industry for the production of lithographic plates, must have good physical and photographic properties. Due to its unique properties, including its good dispersing property and its excellent protective colloid properties, gelatin has been used as the binding agent in layers of photographic elements for many years. Gelatin is, however, subject to dimensional change when subjected to varying temperature, humidity and like conditions. Many natural and synthetic materials have been proposed as substitutes for gelatin in one or more layers of a photographic element to improve dimensional stability. For example, as shown in U.S. Pat. 3,062,674, issued Nov. 6, 1962, and U.S. Pat. 3,142,568, issued July 28, 1964, vinyl or addition polymers are employed in binding agents in layers of photographic elements to improve physical properties, including dimensional stability. However, the use of such vinyl or addition polymers, either as solutions or as hydrosols, in layers of photographic elements, often adversely affects the hardness of the layers, their resistance to abrasion and their adhesion to film supports. It is evident, therefore, that a substituted for gelatin which is not subject to such defects will greatly enhance the art.

Accordingly, it is an object of this invention to provide a class of interpolymers that can be incorporated into photographic materials to obtain products exhibiting good physical and photographic properties.

It is another object of this invention to provide monomeric materials which form a class of interpolymers that can be incorporated into photographic materials exhibiting good dimensional stability, good adhesion, and resistance to abrasion.

It is another object of this invention to provide photographic elements and emulsions which exhibit good physical and photographic properties.

It is still another object of this invention to provide photographic elements and emulsions in which the binding agent comprises gelatin and a film-forming, addition interpolymer containing active methylene groups.

Other objects of this invention will become apparent from an examination of the specification and claims which follow.

In accordance with this invention, it has been found that a film-forming polymer containing at least about 0.1%, by weight, of active methylene groups in aliphatic side chains can be used in binding agents in photographic materials to give products having good dimensional stability, good adhesion to film supports and resistance to abrasion. Moreover, emulsions containing the interpolymers of this invention exhibit increased hardness without the use of additional hardening agents. A particularly effective class of interpolymers useful for this invention is prepared from acrylic type esters having active methylene groups in the ester moiety or in a substituent alpha to the carbonyl group. Such compounds can be represented by the formula:

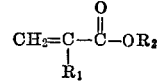

where $R_1$ is hydrogen, alkyl or

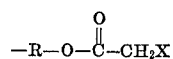

where R is alkylene and X is aliphatic acyl or cyano and $R_2$ is alkyl, cycloalkyl, aryl or

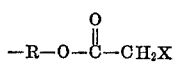

where R and X are as defined, provided that one and only one $R_1$ and $R_2$ is always

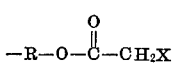

The ethylenically unsaturated polymerizable monomers having the above formula can be prepared using any procedure suitable for this purpose. In general, the reaction of acid chlorides, acid anhydrides or mixed anhydrides containing active methylene groups with acrylic esters containing hydroxyalkyl substituents can be employed. A preferred synthesis for preparing the esters having an active methylene group in the ester moiety involves the reaction of a hydroxyalkyl ester of acrylic or an alpha-alkyl acrylic acid with diketone or cyanoacetyl chloride. The esters having active methylene groups in the alpha-substituent in the above formula can be obtained by reacting the alpha-hydroxyalkyl substituted acrylated esters with diketone or cyanoacetyl chloride. Such reactions are not particularly pressure sensitive and, therefore, can be carried out at atmospheric, superatmospheric or subatmospheric pressure. The temperature range is subject to wide variation depending, for example, upon the particular reactants employed, solvents and like considerations, but generally temperatures up to about 100° C. and often temperatures in the range of about 35 to about 100° C. are suitable. The reaction can be carried out in the absence of solvent or using a suitable vehicle, for example, diethyl ether, ethyl acetate or the like and is generally completed in less than 20 hours, often less than 4 hours. The acrylic esters containing the active methylene groups are generally viscous liquids or oils and can be separated from the reaction medium by any means suitable for this purpose, for example, by distillation.

The acrylic ester monomers containing the active methylene groups can be reacted with like monomers or with at least one other ethylenically unsaturated monomer to form a polymeric substance. The polymers employed in photographic materials according to the practice of this invention are addition interpolymers containing at least about 0.1%, generally about 0.1 to about 1.4%, by weight, of active methylene groups in aliphatic side chains of the interpolymers. Active methylene groups are methylene groups between two activating groups, for example, electronegative groups such as carbonyl. Such methylene groups exhibit unusual chemical activity and are said to be "active." Malonic esters, acetoacetic esters, cyanoacetic esters and 1,3-diketones are examples of compounds containing such groups. In preferred embodiments, the active methylene groups are usually separated from the main polymer chain by at least three carbon atoms and can be introduced into the side chains of an interpolymer by copolymerizing a monomer containing at least one active methylene group, for example, a

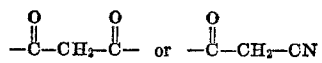

group, and an independently polymerizable unsaturated methylene group with at least one other copolymerizable monomer containing, for example, at least one

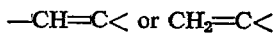

group. Where reference is made to the fact that the active methylene groups are in aliphatic side chains of the interpolymers, this is intended to mean that the chain which links the active methylene group to the main polymer chain of the interpolymer is free of non-aliphatic groups, e.g., aromatic groups, i.e., the active methylene group is bonded to the main chain or "backbone" of the interpolymer through an aliphatic linkage. The molecular weights of the polymers employed in photographic emulsions and elements according to the practice of this invention are subject to wide variation, but are often in the range of about 5,000 to 500,000.

A particularly useful class of polymers containing active methylene groups in aliphatic side chains and which can be employed as substitutes for gelatin in photographic emulsions and elements is prepared by interpolymerizing at least one unsaturated polymerizable compound containing one or more $CH_2=C<$ groups with a different monomer having the formula:

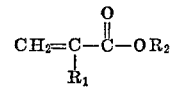

where $R_1$ and $R_2$ are as defined hereinbefore. Useful gelatin substitutes include, therefore, interpolymers comprising at least one unit of a monomer having the above formula with at least one other ethylenically unsaturated polymerizable monomer which forms addition polymers, such as vinyl esters, amides, nitriles, ketones, halides, ethers, alpha-beta-unsaturated acids or esters thereof, olefins, diolefins and the like, as exemplified by acrylonitrile, methacrylonitrile, styrene, alpha-methylstyrene, acrylamide, vinyl chloride, methyl vinyl ketone, fumaric, maleic and itaconic esters, 2-chloroethyl vinyl ether, acrylic acid, sodium methacryloyloxyethyl sulfate, methacrylic acid, dimethylaminoethyl methacrylate, 4,4,9-trimethyl-8-oxo-7-oxa-4-azonia-9-decene-1-sulfonate, N - vinylsuccinamide, N-vinylphthalimide, N-vinylpyrrazolidone, butadiene, isoprene, vinylidene chloride, ethylene and the like.

Interpolymers containing a high relative percentage of acrylic monomers having the above formula are preferred when a hardened emulsion is desired without adding conventional hardening agents to the emulsion. Generally, either said acrylic monomer concentration or the gelatin concentration of the emulsion is present in high concentrations to achieve an emulsion with a high degree of hardness. Hardened emulsions of this type are especially desirable when silver halide systems are used which react adversely with the hardening agents normally used to harden emulsions. Therefore, the interpolymers of this invention are especially useful with gold-sensitized silver halide emulsions which produce substantial fog when used in combination with conventional reducing-type hardening agents. However, suitable hardening agents such as aldehyde hardeners (i.e., formaldehyde, mucochloric acid, etc.) and the like can be used to assist in hardening an emulsion containing the interpolymers of this invention if desired.

Where the interpolymers are used as binding agents to achieve good dimensional stability, good adhesion to the film supports or improved resistance to abrasion, the preferred interpolymers contain (A) at least about 50%, by weight, of a monomer (1) having the formula:

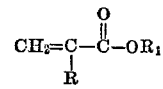

where R is hydrogen or methyl and $R_1$ is alkyl, desirably containing up to about 10 carbon atoms, as exemplified by methyl, propyl, isobutyl, octyl, decyl and the like, (B) about 3 to about 30%, by weight, of acrylic acid or a sulfoester monomer (2) having the formula:

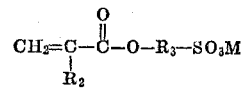

where $R_2$ is hydrogen or alkyl, desirably containing up to about 12 carbon atoms, often 1–8 carbon atoms, as exemplified by methyl, pentyl, octyl, dodecyl and the like, $R_3$ has its valence bonds represented in the above formula on different carbon atoms and can be a divalent hydrocarbon radical or divalent aliphatic hydrocarbon radical in which a chain of carbon atoms joining the oxygen and sulfur atoms in the above formula is interrupted by an oxygen or sulfur atom, i.e., at least one —O— and/or —S— radical interrupts the carbon chains and M is a cation and (C) about 2 to about 20%, by weight, of a monomer (3) having the formula:

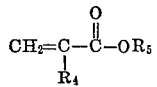

where $R_4$ is hydrogen, alkyl, desirably containing up to 12 carbon atoms as exemplified by methyl, n-butyl, octyl, dodecyl and the like, or

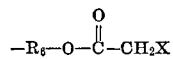

where $R_6$ is alkylene, desirably containing up to 10, preferably 1-8 carbon atoms, as exemplified by ethylene, tetramethylene, 1,3-isobutylene, octamethylene and the like and X is aliphatic acyl, as exemplified by acetyl, butyryl, caprylyl and the like or cyano and $R_5$ is alkyl, desirably containing up to about 10 carbon atoms, as exemplified by methyl, butyl, octyl, decyl and the like, cycloalkyl, desirably containing up to about 10 carbon atoms, as exemplified by cyclopentyl, cyclobutyl, cyclohexyl and the like, aryl, desirably containing up to about 12 carbon atoms, as exemplified by phenyl and the like or

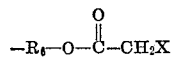

where $R_6$ and X are as defined hereinabove for this radical, provided that one and only one of $R_4$ and $R_5$ is always

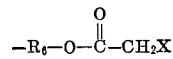

where $R_3$ in the sulfoester monomer (2) above is hydrocarbon, it can be any aliphatic, cycloaliphatic or aromatic radical and will generally contain up to about 12 carbon atoms. Preferred hydrocarbon $R_1$ radicals are alkylene radicals, generally those containing 2-4 carbons. $R_3$ can also be a divalent aliphatic hydrocarbon radical in which there is an —O— and/or —S— radical and generally contains up to 12 carbon atoms. Such $R_3$ radicals can, therefore, be saturated or unsaturated, although saturated divalent alkylene groups in which the carbon chain is interrupted by oxygen and sulfur atoms are preferred. Suitable $R_3$ radicals include, for example, ethylene, 1,3-propylene, 1,2-propylene, tetramethylene, 1,3-isobutylene, pentamethylene, octamethylene, phenylene, bisphenylylene, naphthylene, cyclopentylene, cyclohexylene, 2-butylene butynylene, 2-oxatrimethylene, 3-thiopentamethylene, and the like. M in the sulfoester monomer (2) is a cation, as exemplified by hydrogen, an alkali metal such as sodium or potassium, ammonium, the cation of an organic amine such as triethylene amine, diethanol amine and the like.

A preferred class of vinyl or addition interpolymers, within the above class, which can be employed as gelatin substitutes in photographic materials are film-forming interpolymers of (A) about 50 to about 90%, by weight of a monomer (1) having the formula:

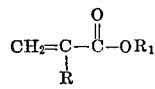

where R and $R_1$ are as defined hereinbefore for monomer (1), (B) about 3 to about 20% by weight, of a sulfoester monomer (2) having the formula:

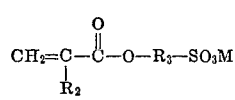

where $R_2$, $R_3$ and M are as defined hereinbefore for monomer (2) and (C) about 2 to 20%, by weight, of a monomer (3) having the formula:

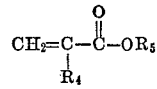

where $R_4$ and $R_5$ are as defined hereinbefore.

Another class of vinyl or addition interpolymers which can be employed as gelatin substitutes in photographic materials are interpolymers in which acrylic acid is used in place of the sulfoester monomer (2). These interpolymers are film-forming, addition interpolymers of (A) about 50 to 90%, by weight, of a monomer (1) having the formula:

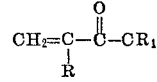

where R and $R_1$ are as defined hereinbefore for monomer (1), (B), about 3 to about 20%, by weight, of acrylic acid and (C) about 2 to about 20%, by weight, of a monomer (3) having the formula:

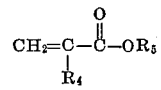

where $R_4$ and $R_5$ are as defined hereinbefore. The preferred class of interpolymers containing sulfoester units preferably contain, in polymerized form, at least about 65%, by weight, of monomer (1), at least about 3%, by weight, of sulfoester monomer (2) and at least about 2%, by weight, of monomer (3). The preferred class of interpolymers containing acrylic acid units preferably contain, in polymerized form, at least about 65%, by weight, of monomer (1), at least about 10%, by weight, of acrylic acid and at least about 2%, by weight, of monomer (3).

In another aspect of this invention where exceptional adhesion of the polymer gel vehicle is desired or higher solubility of the polymer is desired, interpolymers containing at least about 50%, by weight, of monomer (1), about 20% to about 30%, by weight, of the acrylic acid monomer or the sulfoester monomer (2), and about 2 to about 20%, by weight, of the monomer (3) are preferred. However, the more soluble interpolymers can also be used in combination with the less soluble interpolymers to combine the improved features of each respective interpolymer.

The temperature at which the interpolymers described herein are prepared is subject to wide variation since this temperature depends upon such variable features as the specific monomer used, duration of heating, pressure employed and like considerations. However, the polymerization temperature generally does not exceed about 110° C., and most often it is in the range of about 50 to about 100° C. The polymerization can be carried out in a suitable vehicle, for example, water or mixtures of water with water miscible solvents, as exemplified by methanol, ethanol, propanol, isopropyl, alcohol, butyl alcohol, and the like. The pressure employed in the polymerization, if any, is usually only sufficient to maintain the reaction mixture in liquid form, although either superatmospheric or subatmospheric pressures can be used. The concentration of polymerizable monomer in the polymerization mixture can be varied widely with concentrations up to about 40%, by weight, and preferably about 20 to about 40%, by weight, based on the weight of the vehicle, being satisfactory. Suitable catalysts for the polymerization reaction include, for example, the free radical catalysts, such as hydrogen peroxide, cumene hydroperoxide, water soluble azo type initiators and the like. In redox polymerization systems the usual ingredients can be employed. If desired, the polymer can be isolated from the reaction vehicle by freezing, salting out, precipitation or any other procedure suitable for this purpose.

As indicated in U.S. Pat. 3,142,568, issued July 28, 1964, it is sometimes advantageous to include a surface active agent or compatible mixtures of such agents in the preparation of vinyl or addition polymers and in coating photographic materials containing such polymers. Suitable wetting agents include the non-ionic, ionic and amphoteric types as exemplified by the polyoxyalkylene derivatives, amphoteric amino acid dispersing agents, including sulfobetaines and the like. Such wetting agents are disclosed in U.S. Pat. 2,600,831, issued June 17, 1952; U.S. Pat. 2,271,622, issued Feb. 3, 1942; U.S. Pat. 2,271,623, issued Feb. 3, 1942; U.S. Pat. 2,275,727, issued Mar. 10, 1942 and U.S. Pat. 2,787,604, issued Apr. 2, 1957; U.S. Pat. 2,816,920, issued Dec. 17, 1957, and U.S. Pat. 2,739,891, issued Mar. 27, 1956. It has been found that a particular type of non-ionic wetting agent will give outstanding results when so employed. It is particularly convenient to use the non-ionic wetting agents described hereinafter in the formation of the interpolymers containing active methylene groups in their side chains and then incorporate the reaction mixture into a photographic emulsion or element. The wetting agents are generally employed in the polymer preparation in concentrations in the range of about 1% to about 5% based on polymerizable monomer and in coating photographic elements at concentrations in the range of about 0.1 to about 5%, by weight, based on binding agent. Particularly suitable non-ionic wetting agents or coating aids are disclosed in Belgian Pat. 652,862 as having the formula:

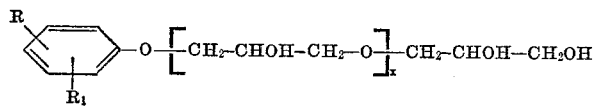

where R is an alkyl radical containing 8 to 18 carbon atoms, $R_1$ is hydrogen or alkyl containing up to 18 carbon atoms, the total number of carbon atoms in R and $R_1$ being in the range of 18 to 24, and $x$ is an integer in the range of 3 to 15.

The following table shows the structure of some specific surface active compounds which can be used in the practice of this invention. In this table $x$ is given as an approximate average value.

TABLE I

R–⟨C₆H₃⟩(R')–O–[CH₂–CHOH–CH₂–O]ₓ–CH₂–CHOH–CH₂OH

| Number | R | Position of R | R' | Position of R' | x |
|---|---|---|---|---|---|
| 1 | $(CH_3)_3CC_6H_{10}-$ | p | $(CH_3)_3CC_5H_{10}$ | o | 9 |
| 2 | $(CH_3)_3CCH_2\overset{|}{C}(CH_3)_2$ | p | H | --- | 4 |
| 3 | $(CH_3)_3CCH_2\overset{|}{C}(CH_3)_2$ | p | $(CH_3)_3CCH_2C(CH_3)_2$ | o | 8 |
| 4 | $-C_{12}H_{25}(iso)$ | p | H | --- | 5 |
| 5 | $-C_{15}H_{31}$ | m | H | --- | 8 |
| 6 | $-CH_3$ | p | $C_{10}H_{21}$ | o | 6 |
| 7 | $C_5H_{11}$ | p | $-C_8H_{17}$ | o | 10 |
| 8 | $C_5H_{11}$ | p | $-C_9H_{19}$ | o | 10 |
| 9 | $(CH_3)_3CC_5H_{10}-$ | p | H | --- | 10 |
| 10 | $C_{10}H_{21}$ | p | $-CH_3$ | o | 7 |
| 11 | $C_{10}H_{21}$ | p | $-C_3H_7$ | o | 8 |
| 12 | $C_{15}H_{37}$ | p | $-CH_3$ | o | 12 |
| 13 | $C_6H_{11}$ | p | $CH_3\overset{|}{C}HC_6H_{13}$ | o | 7 |
| 14 | $CH_3$ | p | $CH_3\overset{|}{C}HC_{10}H_{21}$ | o | 8 |

The above surface active materials, when incorporated in photographic hydrophilic colloid coating compositions and hydrophilic colloid coatings which can, but need not, contain photographic silver halide, increase the ease and efficiency of the coating process and provide a favorably high degree of surface roughness and excellent developer rewettability on coated layers having few or no repellencies, without adversely affecting the photographic properties of the final product. These coating aids are compatible with both acid- and lime-processed gelatin as well as a wide variety of photographic emulsion addenda such as hardeners, antifoggants, mordants, couplers, antistatic agents, and the like.

Dispersions of the photographic silver halide containing addition interpolymers containing active methylene groups, in combination with photographic binding agents, such as gelatin, can be made in a variety of ways. For example, an aqueous gelatin dispersion of the photographic silver halide can be mixed with an aqueous dispersion or solution of the interpolymer. Alternatively, the photographic silver halide can be precipitated in an aqueous dispersion or solution of the interpolymer with or without another colloid, depending upon the dispersing characteristics of the interpolymer. In this case, a water-soluble silver salt such as silver nitrate is admixed with a water-soluble halide such as potassium bromide in the presence of the mixture. In still another procedure, the photographic silver halide is precipitated in an aqueous gelatin solution and digested in the conventional manner known to the art. After digestion, but prior to coating, there is added to the emulsion an aqueous dispersion of the interpolymer containing active methylene groups in its side chains. The bulk of the resulting dispersion can be increased by the addition of more of the interpolymer and/or natural or synthetic colloids or other binding agents suitable for use in photographic silver halide emulsions. Satisfactory colloids include, for example, gelatin, protein derivatives e.g. carboxy methylated proteins, colloidal albumin, cellulose derivatives, synthetic resins such as polyvinyl compounds e.g. polyacrylamide and the like.

The gelatin substitutes described herein can be employed in the binding agent in one or more layers of a photographic silver halide element. However, photographic silver halides are generally precipitated in the presence of binding agents such as gelatin or other colloids which exhibit very good peptizing action. Therefore, the photographic silver halide emulsions or layers of this invention will generally contain some binding agent such as gelatin which exhibits this very good peptizing action. Generally, the concentration of the interpolymers described herein as gelatin substitutes will be in the range of about 20 to about 85%, often in the range of about 50 to about 85%, by weight, based on total binding agent (dry weight), employed in photographic emulsions, photographic emulsion layers or other layers of a photographic element. In the preferred case, the remainder of the binding agent is gelatin, although other colloids also give good results. Where the polymers are used in photographic elements in layers other than the emulsion layers, for example, in filter layers, antihalation layers, antiabrasion layers, antistatic layers, barrier layers, receiving layers for diffusion transfer processes and the like; they can be used as the sole vehicle or in admixture with natural or synthetic colloids such as are mentioned hereinbefore. The silver halide employed in the preparation of light sensitive coatings described herein includes any of the photographic silver halides as exemplified by silver bromide, silver chloride and silver iodide, or mixed silver halides such as silver chlorobromide, silver bromoiodide, and the like. Very good results are obtained with high contrast silver halide emulsions in which the halide comprises at least 50 mole percent chloride. Preferred emulsions of this type contain at least 60 mole percent chloride; less than 40 mole percent bromide and less than 5 mole percent iodide.

The interpolymers described herein can also be incorporated into gelatino emulsions to provide an emulsion with increased hardness properties. The final resultant hardness of said emulsion is apparently dependent on the ratio of the gel in the emulsion and the absolute concentration of acrylate units, which contain active methylene units, in the interpolymer. The preferred interpolymers for this purpose contain from 20 to 80% of said acrylate units which contain active methylene groups. Hardening agents which promote hardening of the emulsion, such as formaldehyde, mucochloric acid and the like are generally not necessary to obtain appreciable hardening when the preferred interpolymers, containing from 20 to 80% of said acrylate units, are used in the emulsion.

The photographic compositions described herein can be coated on a wide variety of supports. Typical supports include polymeric films such as cellulose acetate film, polyvinyl acetal film, polystyrene film, polypropylene film and other polyolefin film, polycarbonate film, polyethylene terephthalate film and other polyester film as well as glass, paper, wood and the like. Supports such as paper which are coated with alpha-olefin polymers, particularly polymers of alpha-olefins containing 2–10 carbon atoms, as exemplified by polyethylene, polypropylene, ethylene-butene copolymers and the like give good results.

The emulsions containing the interpolymers can be chemically sensitized with compounds of the sulfur group as described in Sheppard et al. U.S. Pat. 1,623,499 issued Apr. 5, 1927, noble metal salts such as gold salts, reduction sensitized with reducing agents, and combinations of these. The interpolymers of this invention are especially useful to obtain hardened emulsions containing silver halides which have been chemically sensitized with gold and the like. The fog problems often associated with emulsions, such as gold sensitized emulsions which have been hardened by reducing hardeners such as formaldehyde, mucochloric acid and the like, are substantially reduced by the use of the interpolymer-gelatin emulsions which do not require reducing hardeners to achieve a hardened emulsion. However, the emulsion layers and other layers present in photographic elements made according to this invention can be hardened with any suitable hardener such as aldehyde hardeners, such as formaldehyde, mucochloric acid and the like, aziridine hardeners, hardeners which are derivatives of dioxane, oxypolysaccharides such as oxystarch, oxy plant gums and the like. Such hardened layers will have a melting point in water greater than about 150° F. and preferably greater than 200° F.

The emulsion can also contain additional additives, particularly those known to be beneficial in photographic emulsions, including for example, stabilizers or antifoggants, particularly the water-soluble inorganic acid salts of cadmium, cobalt, manganese and zinc as disclosed in U.S. Pat. 2,829,404, the substituted triazaindolizines as disclosed in U.S. Pats. 2,444,605 and 2,444,607, speed increasing materials, absorbing dyes, plasticizers and the like. Sensitizers which give particularly good results in the photographic compositions disclosed herein are the alkylene oxide polymers which can be employed alone or in combination with other materials, such as quaternary ammonium salts, as disclosed in U.S. Pat. 2,886,437 or with mercury compounds and nitrogen containing compounds, as disclosed in U.S. Pat. 2,751,299.

The interpolymers containing at least about 0.1%, by weight, of active methylene groups in their side chains can be used in various kinds of photographic emulsions. For example, they can be used in direct positive silver halide emulsions, X-ray and other non-spectrally sensitized emulsions as well as in orthochromatic, panchromatic and infrared sensitive emulsions, particularly those sensitized with merocyanine dyes, cyanine dyes, carbocyanine dyes and the like. Furthermore, these polymers can be used in emulsions intended for color photography, for example, emulsions containing color forming couplers or emulsions to be developed by solutions containing couplers or other color generating materials. In addition, these polymers can be used in photographic emulsions containing developers, e.g. polyhydroxybenzenes as well as in emulsions intended for use in diffusion transfer processes which utilize the non-developed silver halide in the non-image areas of the negative to form a positive by dissolving the underdeveloped silver halide and precipitating it on a receiving layer in close proximity to the original silver halide emulsion layer. Such processes are described in Rott U.S. Pat. 2,352,014, Land U.S. Pat. 2,543,181 and Yackel et al. U.S. Pat. 3,020,155. The polymers described herein can also be used in color transfer processes which utilize the diffusion transfer of an image-wise distribution of developer, coupler or dye from a light sensitive layer to a second layer while the two layers are in close proximity to one another. Color transfer processes of this type are described in Yutzy U.S. Pat. 2,856,142, Land et al. U.S. Pat. 2,983,606, Whitmore et al. British Pats. 904,364 and 840,731 and Whitmore et al. U.S. application Ser. No. 392,471. These polymers can also be used in unhardened colloid layers, particularly those designed for processing in hardening developers, as disclosed in British Pat. 825,544, published Dec. 16, 1959. Silver halide emulsions containing these polymers can be processed in monobath processes such as described in Heist et al. U.S. Pat. 2,875,048 or in stabilization type processes.

This invention can be further illustrated by the following examples of preferred embodiments thereof although it will be understood that these examples are included merely for purposes of illustration and are not intended to limit the scope of the invention unless otherwise specifically indicated.

EXAMPLE 1

Twenty-seven grams of 2-hydroxyethyl methacrylate is mixed with 20 g. of diketene. After the addition of 1 g. of hydroquinone (polymerization inhibitor) the mixture is heated to 100° C. After four hours the mixture is distilled in vacuo and the fraction boiling at 100–130° C./1 mm. is collected. This fraction is redistilled from hydroquinone and the principal fraction is collected at 110–120° C./0.3 mm. There is obtained 30 g. of 2-acetoacetoxyethyl methacrylate.

EXAMPLE 2

A solution of 24 g. of 2-hydroxyethyl acrylate and 17 g. of diketene in 100 ml. of ethyl acetate is treated with 0.2 g. of triethylamine. The temperature rises gradually to 33° C. over one hour. The solution is heated at reflux for two hours and concentrated in vacuo to an oil which is submitted to molecular distillation at 9 microns. A yield of 15.8 g. of 2-asetoacetoxyethyl acrylate is obtained at a pot temperature of 73° C.

EXAMPLE 3

To a solution of 82 g. of freshly distilled diketene in 400 ml. of ethyl acetate is added 127 g. of ethyl α-(hydroxymethyl) acrylate. One gram of p-(p-toluenesulfonamido) diphenylamine (polymerization inhibitor) is added and the solution stirred at room temperature. In the course of 3 hours the temperature gradually rises to a maximum of 47° C. The solution is kept for approximately 15 hours at room temperature, treated with 2 g. of anilinophenol and submitted to molecular distillation. Several fractions, shown to be similar by infrared spectroscopy, are collected between 84° C. and 94° C. at 500–505 microns. The total weight of the fractions, which are substantially ethyl α-acetoacetoxymethyl acrylate, is 107 g.

EXAMPLE 4

A suspension of 104 g. of phosphorus pentachloride in 200 ml. of ether is cooled to 10° C. and treated dropwise with 42.5 g. of cyanoacetic acid in 450 ml. of diethylether. The resulting clear solution is concentrated in vacuo to a weight of 54 g. of crude cyanoacetyl choride. The crude cyanoacetyl chloride is added to a solution of 65 g. of 2-hydroxyethyl methacrylate in 125 ml. of diethyl ether containing 25 g. of acrylonitrile. After 2 hours at room temperature the solution is refluxed for 1½ hours and concentrated to an oil in vacuo. Molecular distillation at 12–13 microns yields 60.5 g. of colorless oil at 83–85° C. The infrared analysis, nuclear magnetic resonance and elemental analysis confirmed the structure of the material as being 2-cyanoaceoxyethyl methacrylate.

EXAMPLE 5

As already indicated, compounds of the type prepared according to Examples 1–4 will polymerize with other monomers to form interpolymers containing active methylene groups in the side chains of the interpolymers. To illustrate, one hundred seventy-five ml. of water is swept with nitrogen for ten minutes and placed in a three-necked flask in a bath at 80° C. To this is added 2 ml. of Triton 770 (a 40% solution of a surfactant composition composed of a sodium salt of an alkyl aryl polyether sulfate in isopropanol), 0.5 g. of potassium persulfate and 0.05 g. of sodium bisulfite. To this mixture the following two solutions are added simultaneously with stirring:

(a) 51.5 grams of butyl acrylate, 6.75 g. of acrylic acid, and 10.0 g. of 2-acetoacetoxyethyl acrylate
(b) 0.1 gram of sodium bisulfite and 2 ml. of Triton 770 in 75 ml. of water.

The addition is completed in ten minutes under a constant stream of nitrogen with the flask maintained at 80° C. After heating for an additional fifteen minutes, the latex is cooled. The copolymer latex has the molar composition of 75.7% butyl acrylate, 14.9% acrylic acid, and 9.4% 2-acetoacetoxyethyl acrylate and is prepared at two pH levels—5.0 and 6.2.

EXAMPLE 6

A solution of 4 ml. of Triton 770 in 375 ml. of water is purged with nitrogen and heated to 95° C. 1.0 g. of potassium persulfate and 0.1 g. of sodium bisulfite are added with stirring, followed immediately by the gradual addition from two funnels of the following.

(a) 112.8 g. of methyl acrylate and 5.9 g. of 2-acetoacetoxyethyl acrylate
(b) a solution of 6.3 g. of 3-acryloyloxy-1-methyl propane-1-sulfonic acid sodium salt, 0.23 g. of sodium bisulfite and 4 ml. of Triton 770 in 125 ml. of water.

During the simultaneous addition, which is complete in 12 minutes, the polymerization proceeds briskly with reflux of methyl acrylate. The heating is continued for approximately one hour to obtain a latex of copoly (methyl acrylate-sodium-3-acryloyloxy-1-methyl propane-1-sulfonate - 2 - acetoacetoxyethyl acrylate) which is adjusted to pH 5.

EXAMPLE 7

A solution of 7.5 g. of ethyl acrylate, 2.0 g. of acrylic acid and 1.0 g. of 2-acetoacetoxyethyl methacrylate in 10 ml. of dioxane is mixed with 0.05 g. of 2,2′-azobis(2-methylpropionitrile) and kept at 80° C. for one hour. The copoly (ethyl acrylate-acrylic acid-2-acetoacetoxyethyl methacrylate) is isolated by precipitation in water.

EXAMPLE 8

A solution of 4.0 ml. of Triton 770 in 350 ml. of water is swept with nitrogen and heated to 80° C. 1.0 g. of potassium persulfate and 0.1 g. of sodium bisulfite is added. The following two solutions are added simultaneously over ten minutes with stirring:

(1) 90 g. of methyl acrylate, 25 g. of acrylic acid and 10 g. of ethyl α-acetoacetoxymethyl acrylate
(2) 150 ml. of water containing 4.0 ml. Triton 770 and 0.2 g. of sodium bisulfite.

The resulting latex of copoly (methyl acrylate-acrylic acid ethyl α-acetoacetoxy methyl acrylate) is kept at 80° C. for two hours and cooled to rooom temperature. A portion of the latex is diluted with an equal volume of water and treated with sodium hydroxide (10% solution) to give a solution at pH 5.0 containing 9.8% solids.

EXAMPLE 9

As previously pointed out, surface active compounds of the type listed in Table I can be employed during the preparation of a polymer. To illustrate, a solution of 4 ml. of surface active compound No. 9 of Table I in 365 ml. of distilled water purged with nitrogen is heated to 94° C. To this solution is added 1.0 g. of potassium persulfate and 0.1 g. of sodium bisulfite. Immediately after this addition there is begun the simultaneous addition of the following two solutions:

(a) 114 g. of butyl acrylate and 5.0 g. 2-acetoacetoxyethyl methacrylate
(b) 6 g. of acryloyloxypropane sulfonic acid sodium salt, 4 ml. of surface active compound No. 9 of Table I, and 0.2 g. of sodium bisulfite in 135 ml. of nitrogren-purged water.

This addition is completed in ten minutes with the reaction temperature being maintained in the range of 93–97° C. Stirring and heating are continued for several minutes to complete the polymerization and to destroy residual catalyst. The resulting latex contains copoly (butyl acrylate sodium acryloyloxy propane sulfonate-2-acetoacetoxyethyl methacrylate).

EXAMPLE 10

The procedure of Example 9 is followed employing the following reactants: 222 g. of methyl acrylate, 12 g. of sodium acryloyloxypropane sulfonate, 16 g. of 2-acetoacetoxyethyl methacrylate, 2.0 g. potassium persulfate, 0.6 g. sodium bisulfite, 16 ml. of surface active compound and a total of 1000 ml. of water. A latex having 19.8% solids and pH 3.5 is obtained. This latex is adjusted to pH 5.0 with dilute sodium hydroxide before coating in photographic materials. The latex comprises copoly (methyl acrylate-sodium acryloyloxypropane sulfonate-2-acetoacetoxyethylmethacrylate).

EXAMPLE 11

To a solution of 2 ml. of Triton 770 in 190 ml. of water at 95° C. is added 0.5 g. of potassium persulfate and 0.05 g. sodium bisulfite. Immediately thereafter there is added simultaneously the following two solutions over a period of ten minutes:

(a) 47.5 g. of methyl acrylate, 12.0 grams of acrylic acid and 3.13 g. of 2-methacryloyloxyethyl cyanoacetate
(b) 2 milliliters of Triton 770 and 0.1 g. of sodium bisulfite in 60 ml. of water.

After twenty minutes additional heating, the latex is cooled, diluted with an equal volume of water and converted to a solution at pH 6.5 by the addition of 10% sodium hydroxide solution.

EXAMPLE 12

As previously indicated, interpolymers containing active methylene groups in the side chains can be incorporated into photographic materials to improve resistance to abrasion. To illustrate, copoly (methyl acrylate/sodium 3-acryloyloxy-1-methylpropene - 1 - sulfonate/2 - acetoacetoxyethyl acrylate) latex of Example 6, is incorporated into a fine grain silver chlorobromide emulsion (80 mole percent chloride). The emulsion contains 70 g. of gelatin and 70 g. of copolymer per mole of silver halide. The emulsion is coated on conventional polyester film support at a silver coverage of 412 mg./ft.$^2$ of support (Coating 1) with formaldehyde hardening agent. For comparison purposes copoly (methyl acrylate-sodium 3-acryloyloxypropane-1-sulfonate) (95:5 weight percent) is incorporated into another sample of the emulsion and coated in the same manner (Coating 2). The coatings are exposed on an Eastman 1b sensitometer, developed in Kodak DK–50 developer for approximately 5 minutes at 68° F., fixed in Kodak F–5 fix for approximately 10 minutes and washed.

The resistance to abrasion for the coatings is determined by drawing a pointed stylus under constant pressure across the surface of the coating which is wet with developer, fix or wash water. The resistance to abrasion is rated as follows:

(1) the coating is easily punctured by the stylus and easily tears away from the support (2) the coating is punctured by the stylus and tears away from the support with little difficulty (3) the coating is punctured by the stylus and scratches away from the support with some difficulty (4) the coating is not punctured by the stylus and will not scratch away from the support The results obtained with the above coatings are as follows:

| | Formaldehyde g./100 g. of gelatin (dry wt.) | Resistance to abrasion | | |
|---|---|---|---|---|
| | | Developer | Fix | Wash |
| Coating: | | | | |
| 1 | 10 | 4 | 4 | 4 |
| 2 | 10 | 2 | 2 | 2 |

Similar good resistance to abrasion is exhibited when copoly (butyl acrylate-acrylic acid-2-acetoacetoxyethyl acrylate), copoly (ethyl acrylate-acrylic acid - 2-acetoacetoxyethyl methacrylate), copoly (methyl acrylate-acrylic acid-ethyl α-acetoacetoxymethyl acrylate) and copoly (acrylamide - 2 - acetoacetoxyethyl methacrylate) (90:10, weight percent) as described herein, are used in the binding agent in the above procedure. Furthermore, each of the coatings show improved dimensional stability in comparison to coatings employing gelatin as the sole binding material.

EXAMPLE 13

When interpolymers containing active methylene groups in side chains as described herein, are incorporated into gelatino emulsions, very desirable hardening effects are achieved. To illustrate, a coarse grain silver bromo-iodide emulsion is prepared and coated on a polyester, polyethylene terephthalate support at 473 mg. Ag/ft.$^2$ and 298 mg. of gelatin/ft.$^2$ to serve as a control sample. Identical coatings are made except for the addition of the interpolymer, copoly (sodium methacryloyloxyethyl sulfate-2-acetoacetoxyethyl methacrylate) (referred to as II) comprising 50 weight percent of the monomer 2-acetoacetoxyethyl methacrylate. Additional control samples containing the interpolymer, copoly (ethyl acrylate-acrylic acid) (referred to as (I)), are prepared. To a part of each control sample is added 0.25%, based on the weight of the gelatin present, of a formaldehyde hardening agent.

The coatings are tested for adhesion to the support after each respective step in a development process: after 25 seconds in a 1-phenyl-3-pyrazolidone-hydroquinone developer at 104° F.; after 15 seconds in an ammonium thiosulfate-acetic acid fixer at 104° F.; and after a 40 second wash with water at 104° F. The adhesion is evaluated according to the following standards:

0—Coating floats off
1—Coating rubs off with ease
2—Coating rubs off with difficulty
3—Coating comes off only by scratching with fingernail
4—Coating comes off only by scratching with steel blade Mushiness values (an indication of hardness) are determined on a comparative basis for the respective coatings in (1) elon-hydroquinone developer at 68° F., (2) a thioacrylate-sodium 3-acryloyloxypropane-1-sulfonate-2-aceto-values are reported on a comparative basis in the following table.

| Gel:polymer ratio (by weight) | Hardener | Adhesion | | | Mushiness | | |
|---|---|---|---|---|---|---|---|
| | | Developer | Fix | Wash | Developer | Fix | Wash |
| All gel | None | 1– | 1– | 1– | 27 | 63 | 58 |
| Do | 0.25% H$_2$CO | 2– | 2– | 2– | 46 | 76 | 65 |
| 1 gel:1 (I) | None | 2 | 2– | 2– | 16 | 59 | 53 |
| Do | 0.25% H$_2$CO | 2 | 2 | 2+ | 26 | 61 | 63 |
| 3.5 gel:1 (II) | None | 3+ | 3+ | 3+ | 82 | 72 | 83 |
| 7 gel:1 (II) | do | 3 | 3 | 3 | 75 | 71 | 74 |
| 14 gel:1 (II) | do | 3– | 3– | 3– | 67 | 75 | 85 |

The all gel system and polymer (I) systems serve as control samples. The polymer (II) samples show a remarkable improvement in adhesion and an appreciable overall increase in hardness (mushiness values) in the various stages of development.

EXAMPLE 14

The use of the interpolymers described herein in photographic materials has no substantial adverse effect on photographic properties. To illustrate, copoly (methyl acrylate-sodium 3-acryloyloxypropane-1-sulfonate-2-acetoacetoxyethyl methacrylate) latex of Example 10 is incorporated into a portion of a coarse grain gelatin, silver bromoiodide emulsion which is panchromatically sensitized. The emulsion portion is coated (Coating B) on conventional cellulose acetate film support at a coverage of 460 mg. of silver and 1040 mg. of gelatin/ft.$^2$ of support. For comparison purposes, another portion of the emulsion containing no copolymer is coated in the same manner (Coating A).

Each film coating is exposed on an Eastman 1b sensitometer, developed for 5 minutes in Kodak DK–50 developer, fixed, washed and dried. The photographic speed, gamma and fog are as follows:

| | Copolymer (g./mole AgX) | Relative speed | Gamma | Fog |
|---|---|---|---|---|
| Coating: | | | | |
| A | | 100 | 1.28 | .15 |
| B | 45 | 95 | 1.20 | .11 |

EXAMPLE 15

A 10% solution of copoly(ethyl acrylate-acrylic acid-2-acetoacetoxyethyl methacrylate) (referred to as (III)) comprising approximately 24.1 weight percent acrylic acid, 72.4 weight percent ethyl acrylate and 3.5 weight percent 2-acetoacetoxyethyl methacrylate is incorporated into a coarse-grained silver bromoiodide emulsion of the type commonly used in X-ray films. The emulsion contains 55 g. of gelatin and 55 g. of copolymer per mole of silver halide. The emulsion is coated on polyester (polyethylene terephthalate) film support at a silver coverage of 473 mg./ft.$^2$ of support.

The sample is developed and tested for mushiness and adhesion according to the procedure of Example 13. Control samples of gelatin and a gelatin: copoly (ethylacrylate-acrylic acid) (I) are used for comparison.

| Gel: Polymer Ratio | Adhesion | | | Mushiness | | |
|---|---|---|---|---|---|---|
| | Developer | Fix | Wash | Developer | Fix | Wash |
| All gel | 1– | 1– | 1– | 27 | 63 | 58 |
| 1 gel:1 (I) | 2 | 2– | 2– | 16 | 59 | 53 |
| 1 gel:1 (III) | 3– | 3– | 3– | 45 | 68 | 66 |

The vehicle comprising gelatin and the copolymer, copoly (ethyl acrylate-acrylic acid-2-acetoacetoxyethyl methacrylate) exhibits much better adhesion and higher mushiness values (an indication of hardness) than the control samples prepared in a comparable manner. A gelatin: copoly (methyl acrylate-acrylic acid-2-methacryloyloxyethyl cyanoacetate) vehicle also promotes improvements in adhesion when hardened with a hardening agent such as formaldehyde.

Mixtures of the more soluble solution polymers and the less soluble latex polymers also give improved adhesion, mushiness values, and abrasion resistance when incorporated in a gelatino emulsion. Similar improved results are obtained when a mixture of 33% of the latex polymer copoly (butyl acrylate-sodium sulfopropyl acrylate-2-acetoacetoxyethyl methacrylate) and 67% of the solution polymer copoly (ethylacrylate-acrylic acid-2-acetoacetoxyethyl methacrylate) (24.5%, by weight, acrylic acid) is combined with gelatin on a 50% polymer-50% gelatin, by weight, basis.

EXAMPLE 16

The interpolymers described herein can be used in layers other than photographic silver halide emulsion layers. To illustrate, copoly (methyl acrylate-sodium-3-acryloyloxypropane-1-sulfonate-2-acetoacetoxyethyl methacrylate) latex, prepared according to Example 10, and copoly (butyl acrylate-sodium-3-acryloyloxypropane-1-sulfonate-2-acetoacetoxyethyl methacrylate) latex, prepared according to Example 9, are mixed with an equal quantity of gelatin and coated on a conventional polyester film support at 675 mg. of vehicle per square foot of support. These coatings are designated 4 and 8, respectively, in the following table. For comparison purposes, coatings are prepared using copoly (methyl acrylate-sodium-3-acryloyloxypropane-1-sulfonate) (95:5 wgt. percent) (designated Coatings 1-3 below) and copoly (butyl acrylate-sodium-3-acryloyloxypropane-1-sulfonate) (95:5 wgt. percent) (designated Coatings 5-7 below) in place of the copolymers in Coatings 4 and 8. All coatings contain formaldehyde hardener.

The coatings are immersed in Kodak DK–50 developer (2 minutes), Kodak F–5 Fix (3 minutes) and wash water (10 minutes). The resistance to abrasion is determined using the procedure of Example 12. The results are as follows:

| Coating: | Formaldehyde (percent by weight, based on total vehicle) | Resistance to abrasion | | |
|---|---|---|---|---|
| | | Developer | Fix | Wash |
| 1 | 1.0 | 2 | 2 | 2 |
| 2 | 2.5 | 2 | 2 | 2 |
| 3 | 5.0 | 2 | 2 | 2 |
| 4 | 0.25 | 4 | 4 | 4 |
| 5 | 1.0 | 3 | 3 | 3 |
| 6 | 2.5 | 3 | 3 | 3 |
| 7 | 5.0 | 3 | 3 | 3 |
| 8 | 0.25 | 4 | 4 | 4 |

Although the invention has been described in considerable detail with reference to certain preferred embodiments thereof, it will be understood that variations and modifications can be effected without departing from the spirit and scope of the invention as described hereinabove and in the appended claims.

I claim:

1. A compound having the formula:

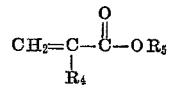

where $R_4$ is hydrogen, an alkyl group containing up to 12 carbon atoms or

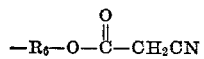

where $R_6$ is an alkylene group containing up to 10 carbon atoms; and $R_5$ is an alkyl group containing up to 10 carbon atoms, a cycloalkyl group containing up to 10 carbon atoms, a phenyl group or

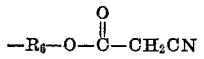

where $R_6$ is an alkylene group containing up to 10 carbon atoms provided that one and only one of $R_4$ and $R_5$ is always

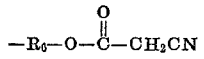

2. 2-cyanoacetoxyethyl methacrylate.

References Cited

UNITED STATES PATENTS 3,459,790   8/1969   Smith _____ 260—464 X

JOSEPH PAUL BRUST, Primary Examiner

U.S. Cl. X.R.

260—464, 465

PO-1050
(5/69)

UNITED STATES PATENT OFFICE
CERTIFICATE OF CORRECTION

Patent No. 3,658,878      Dated April 25, 1972

Inventor(s) Donald A. Smith

It is certified that error appears in the above-identified patent and that said Letters Patent are hereby corrected as shown below:

Col. 2, line 9, "substituted" should read ---substitute---.

Col. 6, line 15, structure $$"CH_2 = \underset{R}{C} - \overset{O}{\overset{\|}{C}} - CR_1"$$ should read $$--- CH_2 = \underset{R}{C} - \overset{O}{\overset{\|}{C}} - OR_1 ---.$$

Col. 6, line 48, "prepared in subject" should read ---prepared is subject---.

Col. 10, line 43, "Heist" should read ---Haist---.

Col. 10, line 69, "asetoacetoxyethyl" should read ---acetoacetoxyethyl---.

Col. 13, line 11, "acryloyloxy-1-methylpropene" should read --- acryloyloxy-1-methylpropane ---.

Col. 14, lines 31-34, "(2) a thioacrylate-sodium 3-acryloyloxy-propane-1-sulfonate-2-aceto-values are reported on a comparative basis in the following table" should read --- 2) a thiosulfate-acid fixer at 68°F and 3) water at 68°F. The values are reported on a comparative basis in the following table. ---.

Signed and sealed this 9th day of January 1973.

(SEAL)
Attest:

EDWARD M. FLETCHER, JR.
Attesting Officer

ROBERT GOTTSCHALK
Commissioner of Patents